United States Patent
Hahm (10) Patent No.: US 7,933,203 B2
(45) Date of Patent: Apr. 26, 2011

(54) DATA BURST ASSEMBLY APPARATUS AND DATA BURST PROCESSING METHOD THEREOF

(75) Inventor: Kyoo-ryon Hahm, Soengnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 11/971,235

(22) Filed: Jan. 9, 2008

(65) Prior Publication Data
US 2008/0205266 A1 Aug. 28, 2008

(30) Foreign Application Priority Data
Feb. 28, 2007 (KR) .................. 10-2007-0020523

(51) Int. Cl.
*H04L 12/26* (2006.01)
(52) U.S. Cl. ..................... 370/230.1; 370/235
(58) Field of Classification Search ....... 370/229–230.1, 370/232–235, 465, 468, 470, 474, 476; 375/240, 375/240.02, 240.23, 240.24, 240.26
See application file for complete search history.

(56) References Cited

U.S. PATENT DOCUMENTS

| | | | | |
|---|---|---|---|---|
| 5,311,517 | A * | 5/1994 | Senoo | 370/428 |
| 5,706,281 | A * | 1/1998 | Hashimoto et al. | 370/252 |
| 6,608,815 | B1 * | 8/2003 | Huang et al. | 370/232 |
| 6,931,017 | B2 * | 8/2005 | McGowan | 370/401 |
| 7,280,478 | B2 * | 10/2007 | Oh et al. | 370/235 |
| 2007/0153916 | A1 * | 7/2007 | Demircin et al. | 375/240.26 |

* cited by examiner

*Primary Examiner* — Kwang B. Yao
*Assistant Examiner* — Andrew Lai
(74) *Attorney, Agent, or Firm* — Stein McEwen, LLP (57) ABSTRACT

A data burst assembly apparatus includes a receiver to receive a packet from at least one source; a monitor to monitor a data traffic condition of a network; and a data burst generator to dynamically determine a value of a generation parameter for generating a data burst with respect to the packet received at the receiver according to the data traffic condition of the network, and to generate the data burst using the generation parameter value. A storage unit may be further included to store a mapping table defining generation parameter values mapped based on data traffic conditions. A data burst generator can read a generation parameter value mapped to a monitoring result from a mapping table and generate a corresponding data burst.

16 Claims, 8 Drawing Sheets

| TRAFFIC MODEL | S1 | S2 | S3 | S4 | S5 | S6 |
|---|---|---|---|---|---|---|
| A | 4,16,7 | 4,16,9 | 4,21,11 | 4,21,13 | 4,30,15 | 4,30,17 |
| B | ... | ... | ... | ... | ... | ... |

DATA BURST ASSEMBLY APPARATUS AND DATA BURST PROCESSING METHOD THEREOF

CROSS-REFERENCE TO RELATED APPLICATION

This application claims the benefit of Korean Application No. 2007-20523, filed in the Korean Intellectual Property Office on Feb. 28, 2007, the disclosure of which is incorporated herein by reference.

BACKGROUND OF THE INVENTION

1. Field of the Invention

Aspects of the present invention relate generally to a data burst assembly apparatus and method. More particularly, aspects of the present invention relate to a data burst assembly apparatus and method for dynamically generating and processing a data burst according to data traffic condition.

2. Related Art

Recently, constant demands for Internet access have led to research and development of optical networks. Particularly, Internet Protocol over Dense Wavelength Division Multiplexing (IP over DWDM) or IP over WDM technology is under development.

Generally, an optical network generates and uses a data burst by adopting a data burst assembly mechanism. The data burst assembly mechanism is a series of processes for aggregating packets from various sources at an egress node or a router, generating a data burst by classifying and arranging packets based on a destination node, and outputting the data burst. According to a service demand state, a process of arranging the packets based on Class of Service (CoS) can be added.

A conventional data burst assembly mechanism is known as a Period Holding Time Threshold (PHTT) mechanism, which generates and outputs collected packets as a data burst after certain period of time has elapsed. The PHTT mechanism features a simplified structure and a constantly adjustable operation time. However, the PHTT mechanism does not take into account the actual amount of data, and, as a result, the PHTT mechanism is highly likely to transfer dummy data. Thus, data burst usability is drastically degraded. In addition, when the data burst generation periods of the edge nodes are identical, collision between the data bursts may happen in succession.

Another conventional data burst assembly mechanism is a Burst Size Maximum Length (BSML) mechanism, which generates and outputs a data burst when the amount of the received data reaches a certain size. In the BSML mechanism, while the efficiency of the data burst can be increased, packets of size below a threshold are continuously stored at the edge node and thus not output.

In an attempt to solve these problems, a hybrid of the two PHTT and BSML mechanisms is proposed. However, when the amount of incoming data is insignificant, the hybrid mechanism works similar to the PHTT mechanism. When the amount of data is high, the hybrid mechanism works similar to the BSML mechanism. Consequently, there is a problem that the hybrid mechanism cannot completely overcome the limitations of both the BHTT and BSML mechanisms. Data burst utilization decreases and successive collisions increases loss and delay.

SUMMARY OF THE INVENTION

Several aspects and example embodiments of the present invention provide a data burst assembly apparatus and method for maximizing data burst usability in accordance with network characteristics by monitoring a data traffic volume and dynamically generating and processing a data burst according to the monitoring result.

According to an aspect of the present invention a data burst assembly apparatus is provided. The apparatus includes a receiver to receive a packet from at least one source; a monitor to monitor a data traffic condition of a network; and a data burst generator to dynamically determine a value of a generation parameter for generating a data burst with respect to the packet received at the receiver according to the data traffic condition of the network, and to generate the data burst using the generation parameter value.

According to another aspect of the present invention, the data burst generator determines a data burst generation period and a data burst generation size according to the determined generation parameter value, and generate the data burst when the determined generation period elapses or when the received packet amount is equal to the determined size.

According to another aspect of the present invention, the data burst assembly apparatus further includes a storage unit to store a mapping table defining generation parameter values mapped based on data traffic conditions. The data burst generator may read a generation parameter value mapped to the monitoring result from the mapping table and generate the data burst using the read generation parameter value.

According to another aspect of the present invention, the mapping table simulates Hurst parameter changes according to the data traffic condition by adjusting setting values of the generation parameter, classifies the setting values of the generation parameter based on sensitivity to the Hurst parameter, and maps and stores the classified generation parameter values to the respective data traffic conditions.

According to another aspect of the present invention, the data burst generator generates the data burst by adjusting at least one of a size and a generation period of a subsequent data burst when the generated data burst collides with an external data burst.

According to another aspect of the present invention, the data burst generator measures Hurst parameter changes according to data traffic conditions by adjusting setting values of the generation parameter, classifies the setting values of the generation parameter based on sensitivity to the Hurst parameter according to the Hurst parameter changes, and generates the data burst using a generation parameter value corresponding to the monitoring result among the classified generation parameter values.

According to another aspect of the present invention, the data burst assembly apparatus further includes a classifier to classify a plurality of packets received at the receiver on a certain basis and to provide the classified packets to the data burst generator; and an output unit to output a data burst generated at the data burst generator to an external node.

According to another aspect of the present invention, the monitor monitors the data traffic condition of the network by checking status of nodes belonging to the network, which adopts a General Multi Protocol Label Switching (GMPLS) protocol.

According to another aspect of the present invention, the generation parameter is a parameter relating to at least one of an assembly period for generating the data burst and a size of the data burst.

According to another aspect of the present invention, a data burst processing method to process and generate a data burst to be transmitted through a network includes receiving a packet from at least one source; monitoring a data traffic condition of the network; dynamically determining a value of a generation parameter for generating a data burst with respect to the received packet according to the data traffic condition of the network; and generating the data burst using the determined generation parameter value.

According to another aspect of the present invention, the generating includes determining a data burst generation period and a data burst generation size according to the determined generation parameter value; and generating the data burst when the determined generation period arrives or when an amount of received packets is equal to the determined size.

According to another aspect of the present invention, the determining of the value includes reading a generation parameter value mapped to the monitoring result from a mapping table defining generation parameter values mapped to respective data traffic conditions, and determining the generation parameter value as the read value.

According to another aspect of the present invention, the data burst is generated by adjusting at least one of a size and a generation period of a subsequent data burst when the generated data burst collides with an external data burst.

According to another aspect of the present invention, the determining includes measuring Hurst parameter changes according to data traffic conditions by adjusting setting values of the generation parameter; classifying the setting values of the generation parameter based on sensitivity to the Hurst parameter based on the measured Hurst parameter changes; and determining a generation parameter value by applying a weight to a parameter corresponding to the monitoring result among the classified generation parameter values.

According to another aspect of the present invention, the data burst processing method further includes classifying a plurality of packets on a certain basis when the plurality of packets is received.

According to another aspect of the present invention, the data burst is generated using the classified packets.

According to another aspect of the present invention, the data burst processing method further includes outputting the generated data burst to an external node.

According to another aspect of the present invention, the monitoring of the data traffic condition includes checking status of nodes belonging to the network, which adopts a General Multi Protocol Label Switching (GMPLS) protocol.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the embodiments, taken in conjunction with the accompanying drawings of which.

DETAILED DESCRIPTION OF THE EMBODIMENTS

Reference will now be made in detail to the present embodiments, examples of which are illustrated in the accompanying drawings, wherein like reference numerals refer to the like elements throughout. The embodiments are described below in order to explain the present invention by referring to the figures.

Figure 1:
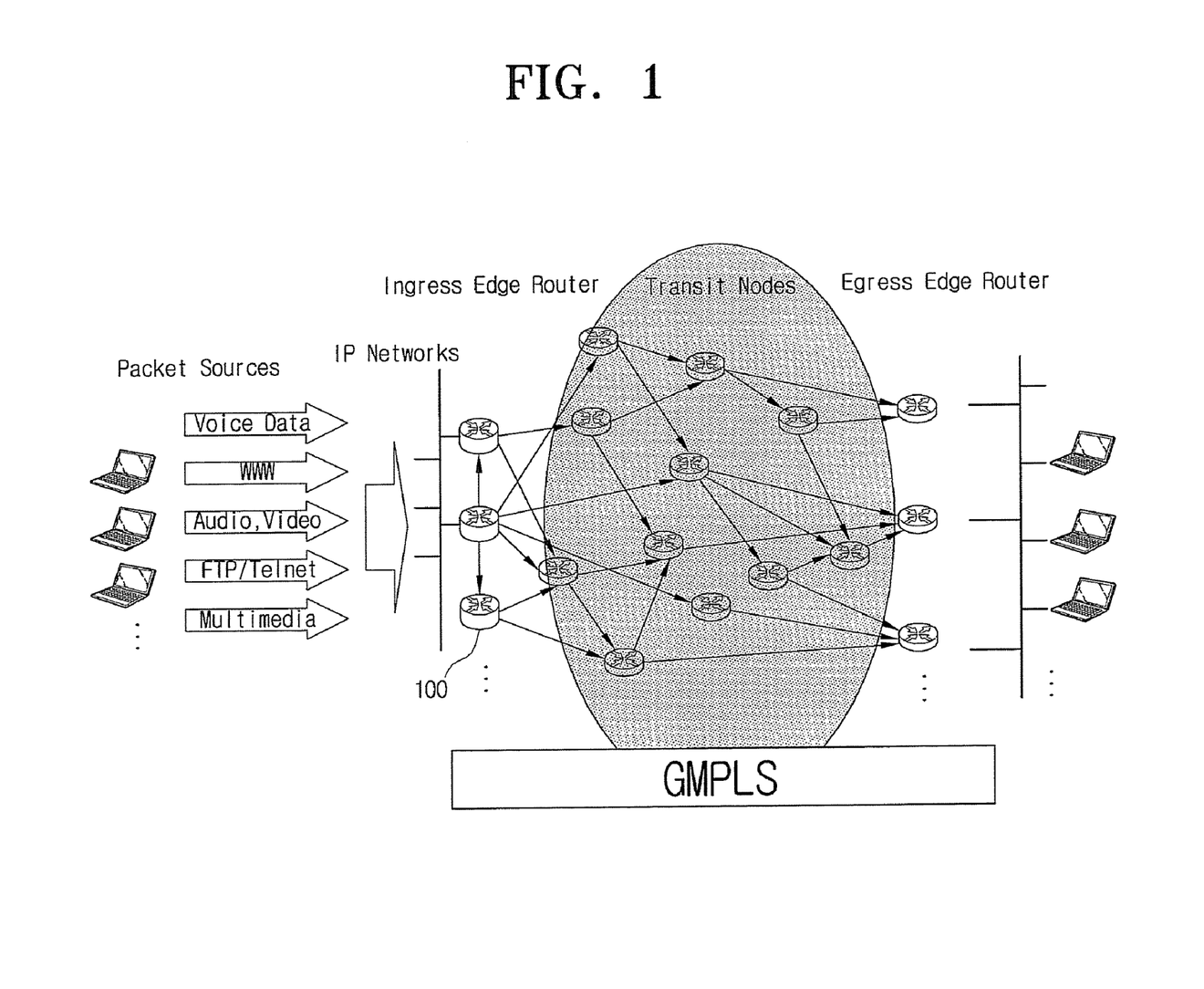
FIG. 1 is a conceptual diagram of a network environment structure that adopts a data burst assembly apparatus according to an example embodiment of the present invention.

FIG. 1 is a conceptual diagram of an optical network environment structure that adopts a data burst assembly apparatus according to an example embodiment of the present invention. As shown in FIG. 1, a variety of packets are received from a plurality of packet sources. For example, packets of video data, web server access signal, audio data, and video data are received.

The received packets may be included as one data burst by an ingress edge router that resides at the vertical line shown in FIG. 1. The data burst assembly apparatus 100 may be installed or implemented using an ingress edge router to transmit data packets to correspondent terminals at an egress edge router connected to the network, via one or more transmit routers, and communicates based on the General Multi Protocol Label Switching (GMPLS) protocol. While the optical network environment according to the GMPLS protocol is shown in FIG. 1, the present invention is not limited to this network environment; aspects of the present invention are also applicable to other types of network environments.

The data burst assembly apparatus 100 shown in FIG. 1 may transmit data using an optical burst switching routing technique. In the optical burst switching routing technique, the data burst to be sent includes a header and a payload. Information of a data amount and destination address is recorded in the header. According to the optical burst switching routing technique, the data burst assembly apparatus 100 separates the burst payload and the header of the generated data burst and transmits the payload and header in different frequency channels. The separated header includes a Burst Control Packet (BCP). Accordingly, the burst payload packet and the BCP are sent to a next core router based on the destination address. When the burst payload packet and the BCP are transferred to the egress edge router in this manner, the separated burst payload and header are recombined and then transmitted to a customer edge.

The data burst assembly apparatus 100 dynamically generates the data burst. Specifically, the data burst assembly apparatus 100 dynamically determines setting values with respect to a generation parameter required for a data burst generation algorithm by applying a weight to major parameters based on the data traffic condition of the network. Accordingly, the data burst is generated by applying the determined generation parameter values. The generation period and the size of the data burst may be adjusted by dynamically applying a weight. As a result, the data burst transmission efficiency can be maximized.

Various mathematical models for modeling the actual data amount coming into the network have been researched. One of the mathematical models is a Hurst parameter, which changes as the traffic of the data coming into the network changes, such as from low traffic to heavy traffic. Since it is difficult to accurately predict the Hurst parameter of the actual data traffic, the Hurst parameter may be assumed to be the statistically measured value 0.75~0.9 in practice. To measure the Hurst parameter, discrete wavelet-based analyses, Rescaled Range Statistics (R/S) analyses, variance-time analyses, and/or Whittle estimator may be used, although additional analytic techniques may also be employed.

The data burst assembly apparatus 100 can determine an optimal value of the generation parameter required for the data burst generation using a trial and error scheme or a rule mapping scheme. According to the trial and error scheme, the data burst assembly apparatus 100 measures changes of the Hurst parameter through the simulation by varying the value of the generation parameter with respect to the current data traffic conditions. Of the generation parameter variation values, the most insensitive value to the change of the Hurst parameter may be set to the optimal value of the generation parameter in the current data traffic condition.

The rule mapping scheme defines optimal parameter values of the data traffic conditions in a mapping table by simulating and measuring the Hurst parameter change status while varying the generation parameter value under various data traffic conditions. Hence, the data burst assembly apparatus 100 can read and use setting values of the generation parameter suitable for the current data traffic condition based on the mapping table.

The generation parameter is a parameter relating to a factor required for the data burst generation. In the data burst generation, the generation period and size of the data burst may act as considerable factors. The dominant factor of the data burst generation period may be a queuing delay time or a timer setting time. The dominant factor of the data burst size can be a queue size. Accordingly, with various setting values for determining the queuing delay time, the timer setting time, and the queue size, the Hurst parameter value is measured and the setting value of little Hurst parameter change in the data traffic change can be determined as the optimal value of the corresponding generation parameter. Therefore, different weights can be applied to the respective generation parameters according to the data traffic, and an optimal data burst for the particular data traffic condition can be generated.

Figure 2:
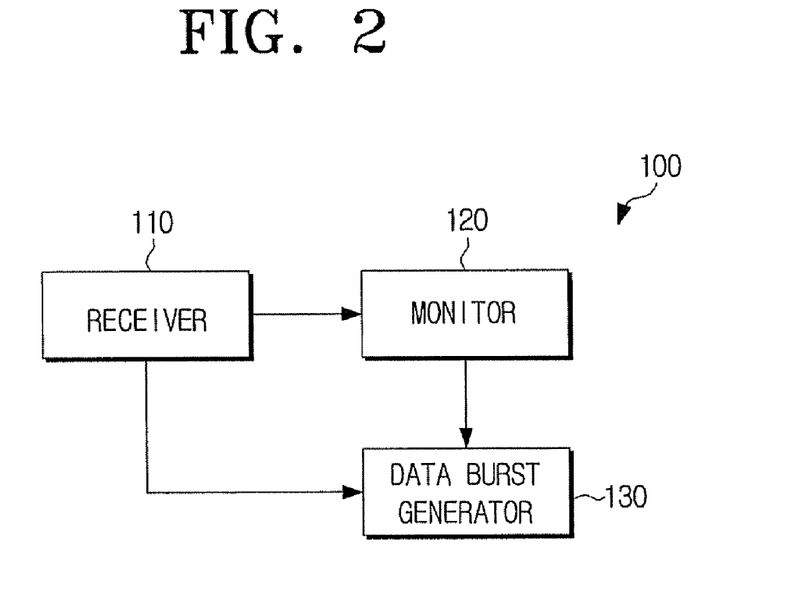
FIGS. 2 through 4 are block diagrams of a data burst assembly apparatus according to example embodiments of the present invention.
Figure 3:
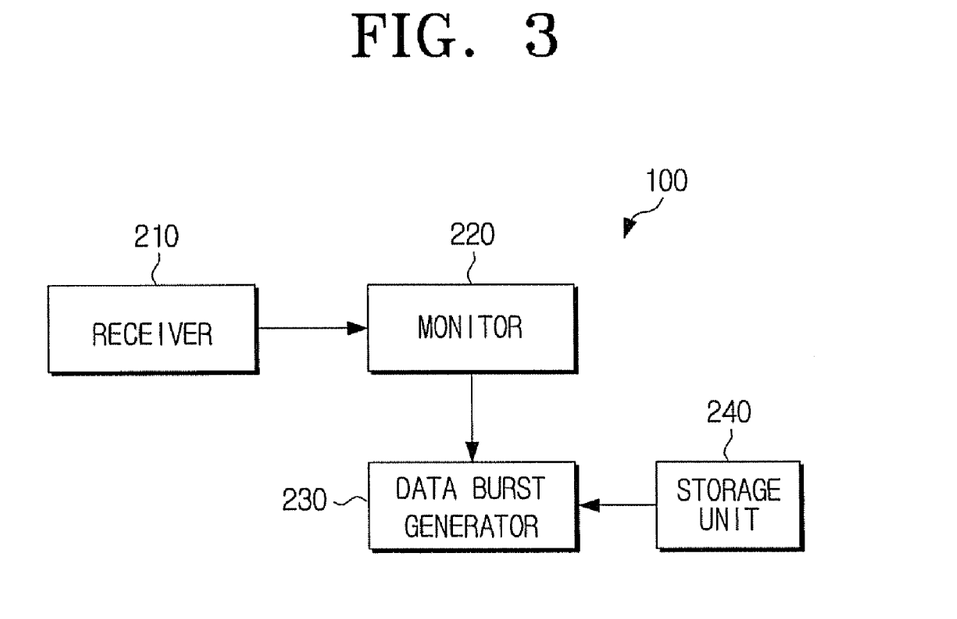
Figure 4:
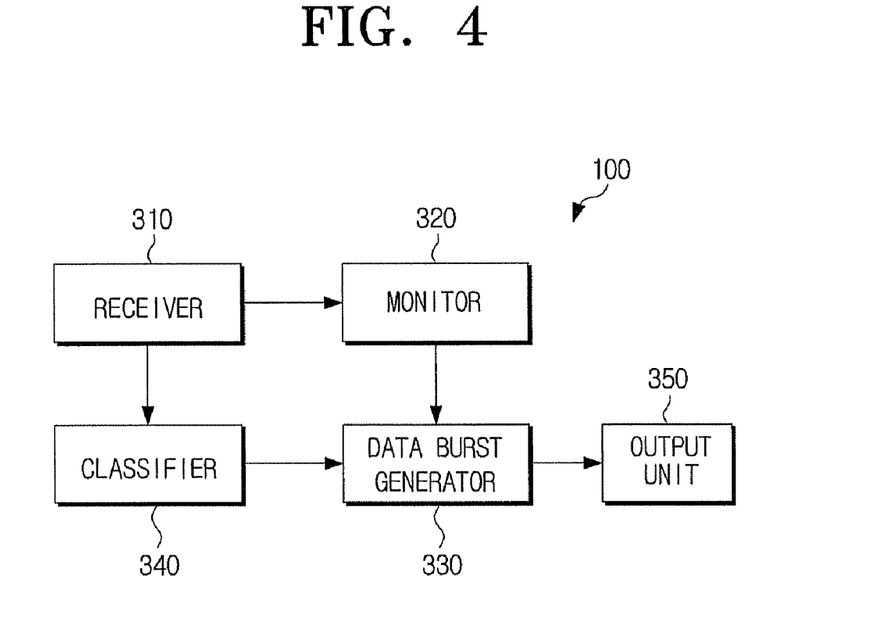

FIGS. 2 through 4 are block diagrams of a data burst assembly apparatus according to various example embodiments of the present invention. As shown in FIG. 2, the data burst assembly apparatus 100 includes a receiver 110, a monitor 120, and a data burst generator 130. According to other aspects of the invention, the data burst assembly apparatus 100 (and the data burst assembly apparatuses 200 and 300 shown in FIGS. 3 and 4, respectively) may include additional or different components. Similarly, the functionality of one or more units may be integrated into a single component. The data burst assembly apparatus 100, 200, or 300 may be embodied in a stand-alone unit, such as a router, or may be integrated into another network component.

The receiver 110 receives packets from various packet sources, such as voice data, web data, audio-visual (AV) data, and/or data from FTP/Telnet. The monitor 120 monitors the data traffic volume of the foreign network to which the data burst assembly apparatus 100 is connected. The monitor 120 can monitor the data traffic volume by checking a condition of nodes belonging to the GMPLS protocol based network. In doing so, when a congestion inform message is received from a node, the monitor 120 can recognize that the load is put on the corresponding node. The monitor 120 may predict the data traffic volume not only by using the measured values of the actual traffic data amount and the pattern change, but also by measuring the Hurst parameter value using the mathematical approach method of discrete wavelet-based analyses, R/S analyses, variance-time analyses, and/or Whittle estimator.

The data burst generator 130 generates the data burst by determining the optimal setting value of the generation parameter based on the monitoring result from the monitor 120 and executing the burst generation algorithm with the determined setting value. Ultimately, the generation period and the size of the data burst may be dynamically adjusted depending on the data traffic volume. The data burst generator 130 can determine the optimal setting value of the generation parameter according to the trial and error scheme or the rule mapping scheme.

FIG. 3 shows the data burst assembly apparatus 100 according to another example embodiment of the present invention. As shown in FIG. 3, the data burst assembly apparatus 100 includes a receiver 210, a monitor 220, a data burst generator 230, and a storage unit 240. The receiver 210 and the monitor 220 have the same function as in FIG. 2, and thus their description shall be omitted. The storage unit 240 stores the mapping table arranged using the rule mapping scheme.

When the monitor 220 carries out the monitoring, the data burst generator 230 reads the optimal setting value corresponding to the monitoring result from the mapping table and executes the generation algorithm. Hence, the data burst generation may be performed in accordance with the data traffic condition.

FIG. 4 shows the data burst assembly apparatus 100 according to yet another example embodiment of the present invention. As shown in FIG. 4, the data burst assembly apparatus 100 includes a receiver 310, a monitor 320, a data burst generator 330, a classifier 340, and an output unit 350. The receiver 310, the monitor 320, and the data burst generator 330 of FIG. 4 have the same functions as in FIG. 2 or FIG. 3, and thus their descriptions shall be omitted.

The classifier 340 classifies packets received at the receiver 310 based on the destination and provides the classified packets to the data burst generator 330. The classifier 340 detects destination node information recorded in the header of the packet. Accordingly, packets having the same destination node information are classified together. When the classified packets destined for one destination are received in the size determined according to the dynamic generation algorithm, or when the end of the generation period determined by the dynamic generation algorithm is getting close, the data burst generator 330 generates one data burst using the packets.

The output unit 350 routes the generated data burst to the corresponding destination. The output unit 350 reserves resources of a neighbor router or a node in the network using a pre-stored routing table (not illustrated), and transmits the data burst to the router or the node on the destination side using the reserved resources. In doing so, the header and the payload may be separated from each other and transmitted over the control channel and the data channel respectively. Such transmission is well known and thus is not further explained.

Although a storage unit is not illustrated in FIG. 4, a storage unit may be further included if the rule mapping scheme is adopted in the data burst assembly apparatus 300 shown in FIG. 4. Accordingly, the data burst generator 330 may determine the optimal generation parameter setting value using the mapping table stored in the storage unit (not shown).

Figure 5:
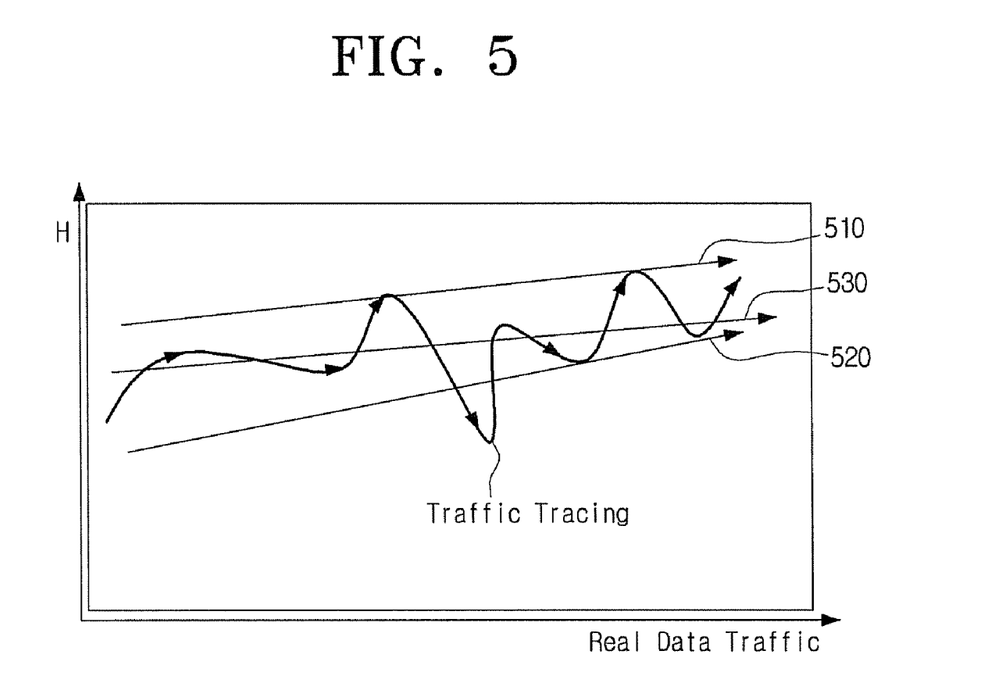
FIG. 5 is a graph of Hurst parameter variation according to data traffic change.

FIG. 5 is a graph of Hurst parameter variation status according to data traffic conditions. As shown in FIG. 5, the Hurst parameter changes to various values in real time according to changes in the data traffic status. Thus, it may be difficult to accurately acquire the change value of the Hurst parameter each time and to conduct the simulation required to generate the mapping table. However, it is possible to approximate a maximum value 510 and a minimum value 520 of the change range by monitoring the change values of the Hurst parameter over a certain period of time. The mean value 530 of the maximum value 510 and the minimum value 520 may be calculated and used for the simulation. The Hurst parameter value based on the data traffic condition may be acquired from the graph of the mean value 530. By defining the optimal setting parameter insensitive to the Hurst parameter using the data burst assembly, the design can maximize the limited data utilization per link in the network environment.

Figure 6:
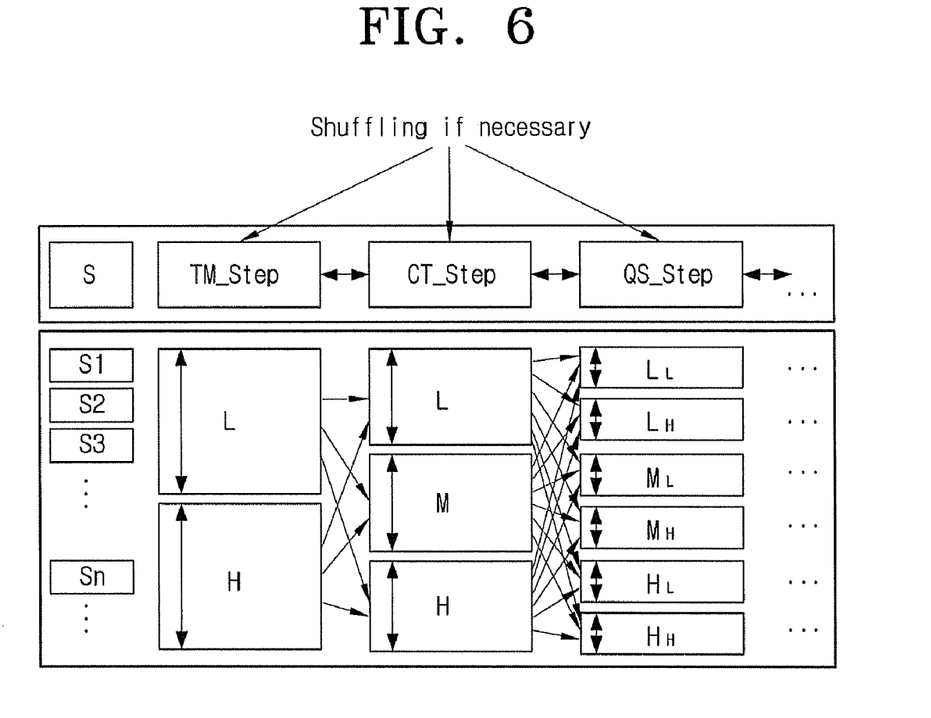
FIG. 6 is a conceptual diagram of a mapping table generation in the data burst assembly apparatus according to an example embodiment of the present invention.

FIG. 6 is a conceptual diagram of a mapping table generation in the data burst assembly apparatus according to an example embodiment of the present invention. In FIG. 6, the generation parameter is classified to TM_Step, CT_Step, and/or QS_Step. The priority of the generation parameters may be shuffled if necessary. TM_Step is a parameter for determining the generation period to execute the data burst assembly job within a certain time. QS_Step is a queue size determining parameter to determine the size of the data burst. CT_Step is a parameter for determining the data size fed to the queue. According to other aspects of the present invention, various generation parameters may be designed using the packet type, the size, and the timer period by taking into account the hardware and the real network environment.

A plurality of setting values S1 through Sn is prepared for the generation parameters. According to the simulation result by applying the setting values, the setting values can be classified based on the sensitivity to the Hurst parameter. As illustrated in FIG. 6, the setting values are classified to L and H in TM_Step. The setting value insensitive to the Hurst parameter change is classified to the L area, and the setting value sensitive to the Hurst parameter change is classified to the H area.

As for the next generation parameter CT_Step, the L and H areas are divided to L, M, and H areas. As for the next generation parameter QS_Step, the L, M, and H areas are subdivided to L and H areas, that is, to six areas of $L_L$, $L_H$, $M_L$, $M_H$, $H_L$, and $H_H$ in total. The generation parameters may be dynamically defined by selecting the setting value of the suitable area according to the current monitoring result value. By applying the weight to the more suitable generation parameter among the several generation parameters in the current data traffic, efficient data burst utilization is feasible. FIG. 6 illustrates the division into two, three, and six areas merely as an example. More precise generation parameter can be set by diving into a plurality of areas of any number, such as three, five, or fifteen areas.

Figure 7:
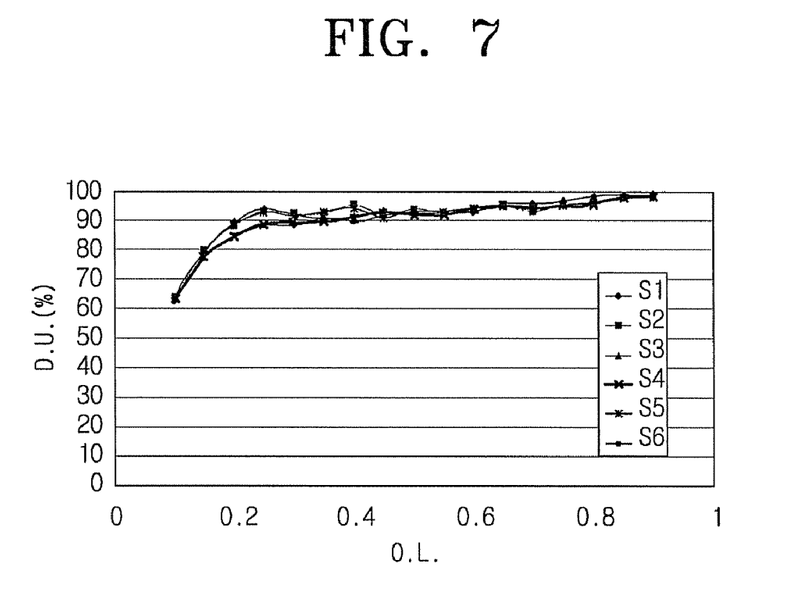
FIG. 7 is a graph of load based data burst utilization according to the defined setting values.

FIG. 7 is a graph of the load based data burst utilization in relation with the setting values. When the data burst is generated according to the setting values S1 through S6 of each parameter, the relation between Offered Load (O.L.) and Data burst Utilization (D.U.) is shown in FIG. 7. As shown in FIG. 7, even when O.L. is low (below 0.3), D.U. over 92% can be acquired. Particularly, even when O.L. is at the lowest 0.1, D.U. over 60% can be attained. In case of O.L. 0.6 or more, that is, in case of the middle or higher O.L. level, D.U. about 95% can be attained, which is close to the ideal value.

Figure 8:
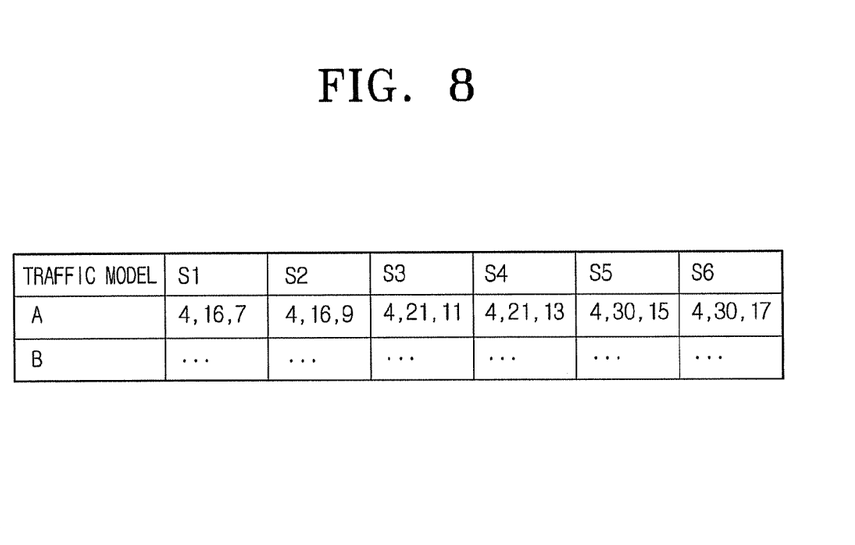
FIG. 8 is a conceptual diagram of a mapping table structure used in the data burst assembly apparatus according to an example embodiment of the present invention.

FIG. 8 is a conceptual diagram of a mapping table structure. As shown in FIG. 8, values of S1 through S6 are arranged according to the traffic model, that is, according to the data traffic conditions. Since the data burst assembly apparatuses 100, 200, and 300 can dynamically define the generation parameters according to the data traffic volume, the data burst generation period and size are adjusted dynamically. Therefore, successive collisions of data bursts can be avoided.

Figure 9:
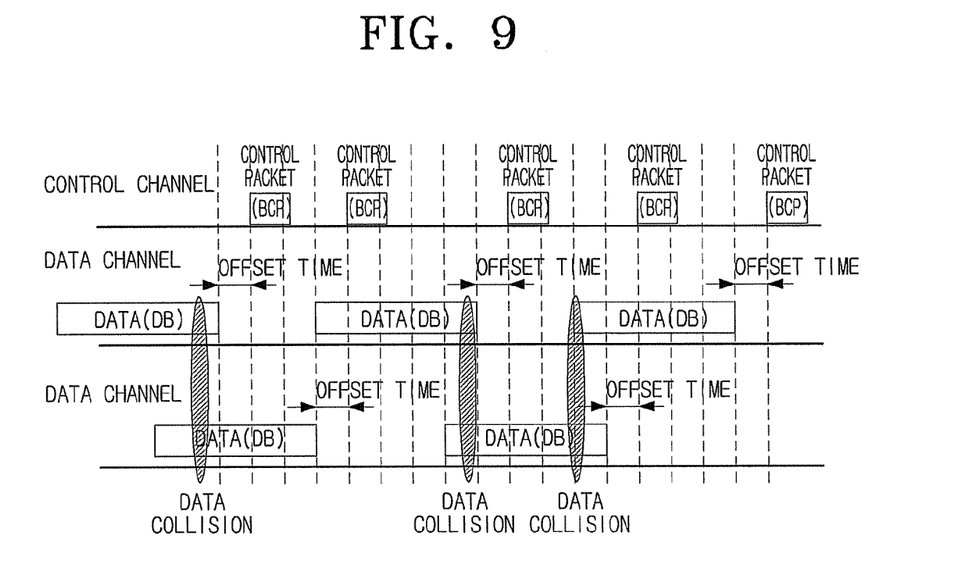
FIG. 9 is a conceptual diagram of successive collisions of data bursts.

FIG. 9 is a conceptual diagram of successive collisions of data bursts. When two or more conventional data burst assembly apparatuses transmit a data burst, the data bursts may collide with each other. In this case, when the data burst generation periods of the two data burst assembly apparatuses are identical or the thresholds of the data burst size are identical, subsequent data bursts may also collide. As shown in FIG. 9, three data bursts are subject to collision in sequence.

Figure 10:
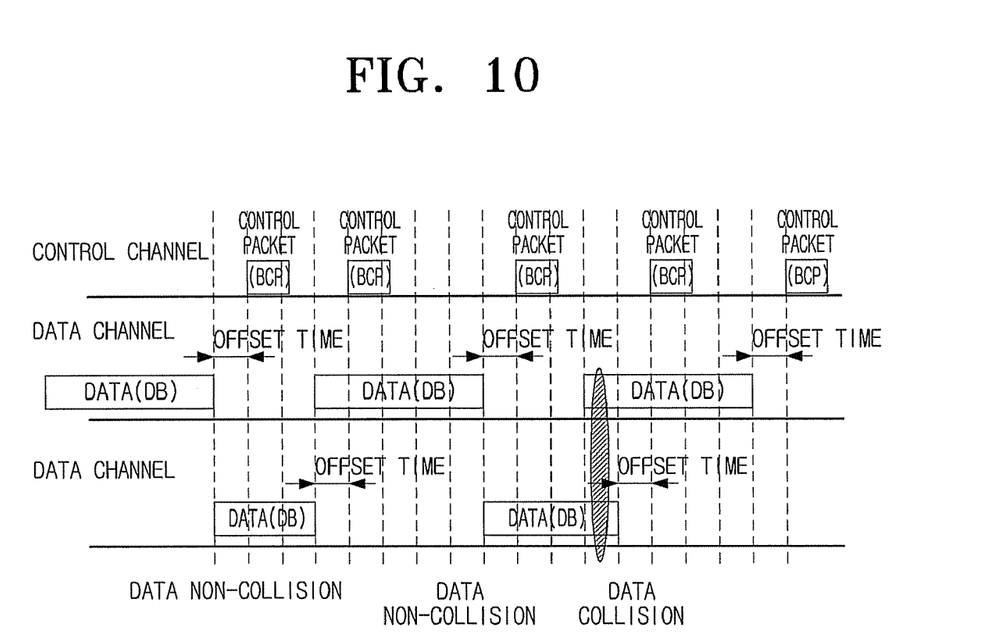
FIG. 10 is a conceptual diagram of data burst size adjustment to avoid successive collisions of the data bursts.

FIG. 10 is a conceptual diagram illustrating the successive data burst collisions are avoided by the data burst assembly apparatus according to an example embodiment of the present invention. The data burst assembly apparatus is able to adjust the setting values of the generation parameter by monitoring whether the data bursts collide with each other. When the collision is monitored, a following collision is prevented by adjusting the setting values of the generation parameter. According to another aspect of the invention, a subsequent collision can be blocked with the synchronization by randomly determining the data burst generation size.

Even when a data burst generated at another data burst assembly apparatus collides with the data burst generated at the data burst assembly apparatus of the present invention once, as shown in FIG. 10, a successive collision does not occur because the size of the subsequent data burst is reduced. If the data burst size is reduced, as shown in FIG. 10, the generation period may be altered based on the data traffic condition. The successive collision can be avoided merely by adjusting the data burst generation period. In addition, the successive collision can be prevented by changing both the data burst generation period and the size based on the traffic condition.

Figure 11:
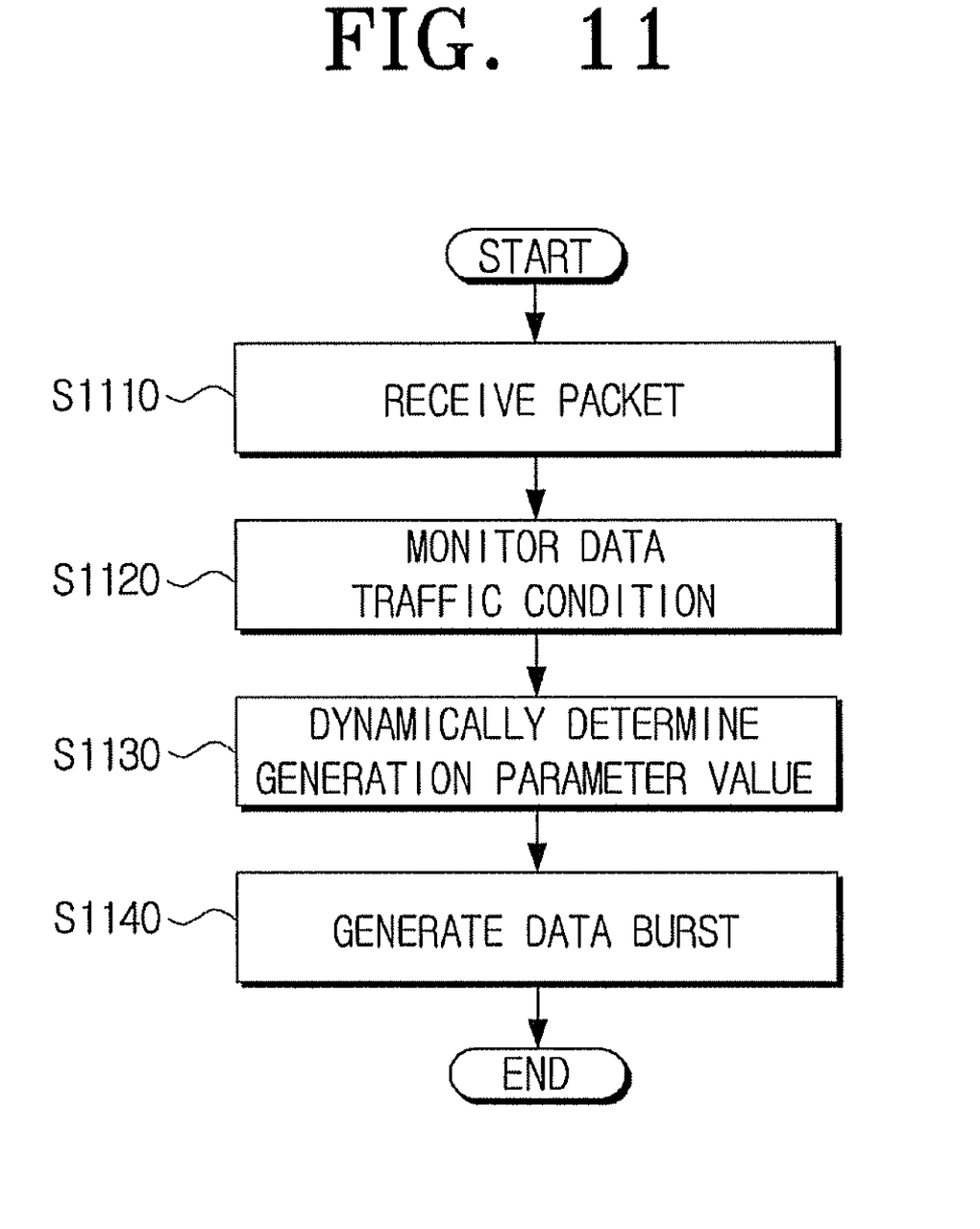
FIG. 11 is a flowchart of a data burst processing method according to an example embodiment of the present invention.

FIG. 11 is a flowchart of a data burst processing method according to an example embodiment of the present invention. When packets are received from a plurality of sources at block S1110, the data traffic condition of the network is monitored at block S1120. The monitoring may be carried out by checking the status of nodes belonging to the GMPLS protocol based network, as shown, for example, in FIG. 1. Upon acquiring the monitoring result value, the setting value of the generation parameter suitable for the acquired result value, that is, suitable for the current data traffic condition, is dynamically determined at block S1130. As described earlier, the setting values of the generation parameter may be dynamically defined using the trial and error scheme or the rule mapping scheme.

When the setting value of the generation parameter is defined, the data burst is generated according to the generation algorithm by applying the determined setting value at block S1140. In other words, the data burst is generated and output by applying the generation period and size, which are dynamically adjusted.

Figure 12:
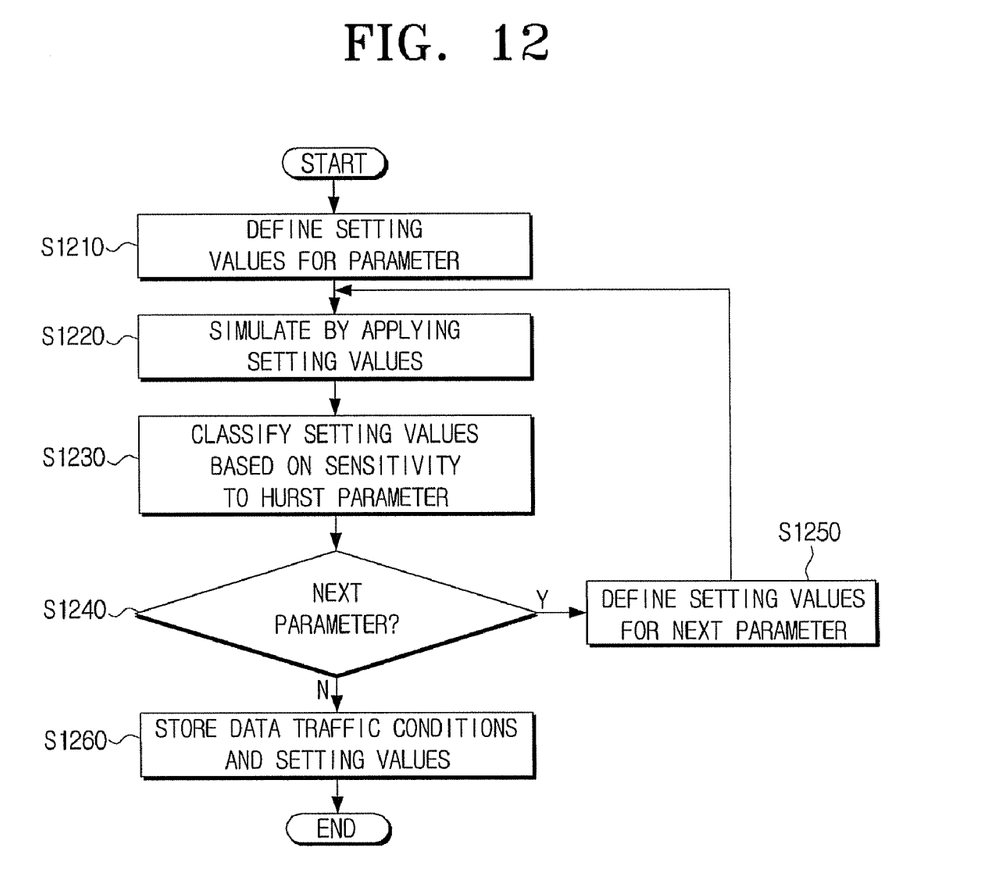
FIG. 12 is a flowchart of a mapping table generating process in the data burst processing method according to an example embodiment of the present invention.

FIG. 12 is a flowchart outlining a dynamic setting method of the generation parameter. A plurality of setting values is defined for the generation parameter at block S1210. Accordingly, the simulation is conducted by applying the setting values at block S1220. After checking the sensitivity to the Hurst parameter by referring to the experiment result, the setting values are classified based on the check result at block S1230. The classification and the change characteristic of the Hurst parameter have been described in FIGS. 6 and 7 and thus not shall be explained further.

When the setting values for one generation parameter are obtained, the data burst assembly apparatus determines whether a next generation parameter exists at block S1240. If so, a plurality of setting values is defined for the next generation parameter at block S1250 and blocks S1220, S1230, and S1240 are repeated. As a result, the plurality of the setting values can be processed in parallel, to thus rapidly determine the generation parameter.

When the setting values of all the generation parameters are obtained, an optimal setting value suitable for the current data traffic condition is determined and stored at block S1260. According to the rule mapping scheme, the optimal setting values for diverse data traffic conditions can be defined and pre-stored in the manner of FIG. 12 and immediately applied for the generation of the data burst.

As set forth above, a data burst assembly suitable for the network condition can be achieved by determining the optimal generation parameter based on the data traffic volume and generating the data burst accordingly.

An aspect of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, DVDs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A data burst assembly apparatus to generate a data burst to be sent via a network, the apparatus comprising:
    a receiver to receive a packet from at least one source;
    a monitor to monitor and predict a data traffic condition of the network;
    a data burst generator to dynamically determine a value of a generation parameter to generate the data burst with respect to the packet received at the receiver according to the data traffic condition of the network, and to generate the data burst using the generation parameter value; and
    a storage unit to store a mapping table defining generation parameter values mapped based on data traffic conditions,
    wherein the data burst generator reads a generation parameter value mapped to the monitoring result from the mapping table and generates the data burst using the read generation parameter value, and
    wherein the mapping table simulates Hurst parameter changes according to the data traffic condition by adjusting setting values of the generation parameter, classifies the setting values of the generation parameter based on sensitivity to the Hurst parameter, and maps and stores the classified generation parameter values to the respective data traffic conditions.

2. The data burst assembly apparatus of claim 1, wherein the data burst generator determines a data burst generation period and a data burst generation size according to the generation parameter value, and generates the data burst when the determined generation period elapses or when the received packet amount is equal to the determined size.

3. The data burst assembly apparatus of claim 1, wherein the data burst generator generates the data burst by adjusting at least one of a size and a generation period of a subsequent data burst when the generated data burst collides with an external data burst.

4. The data burst assembly apparatus of claim 1, further comprising:
    a classifier to classify a plurality of packets received at the receiver on a certain basis and to provide the classified packets to the data burst generator; and
    an output unit to output a data burst generated at the data burst generator to an external node.

5. The data burst assembly apparatus of claim 1, wherein:
    the monitor monitors the data traffic condition of the network by checking a status of nodes belonging to the network; and
    the network adopts a General Multi Protocol Label Switching (GMPLS) protocol.

6. The data burst assembly apparatus of claim 1, wherein the generation parameter is a parameter relating to at least one of an assembly period for generating the data burst and a size of the data burst.

7. A data burst assembly apparatus to generate a data burst to be sent via a network, the apparatus comprising:
    a receiver to receive a packet from at least one source;
    a monitor to monitor a data traffic condition of the network; and
    a data burst generator to dynamically determine an optimal value of a generation parameter to generate the data burst with respect to the packet received at the receiver according to the data traffic condition of the network, and to generate the data burst using the optimal generation parameter value,
    wherein the data burst generator measures Hurst parameter changes according to data traffic conditions by adjusting setting values of the generation parameter, classifies the setting values of the generation parameter based on sensitivity to the Hurst parameter according to the measured Hurst parameter changes, and generates the data burst using the optimal generation parameter value corresponding to the monitoring result among the classified setting values of the generation parameter.

8. A data burst processing method to process and generate a data burst to be transmitted through a network, the method comprising:
    receiving a packet from at least one source;
    monitoring and predicting a data traffic condition of the network;
    dynamically determining a value of a generation parameter to generate the data burst with respect to the received packet according to the data traffic condition of the network; and
    generating the data burst using the generation parameter value,
    wherein the determining of the value of the generation parameter comprises:
        reading a generation parameter value mapped to the monitoring result from a mapping table defining generation parameter values mapped to respective data traffic conditions; and determining the generation parameter value as the read value, and wherein the mapping table simulates Hurst parameter changes according to the data traffic conditions by adjusting setting values of the generation parameter, classifies the setting values of the generation parameter based on sensitivity to the Hurst parameter, and maps and stores the classified generation parameter values to the respective data traffic conditions.

9. The data burst processing method of claim 8, wherein the generating comprises:

determining a data burst generation period and a data burst generation size according to the determined generation parameter value; and generating the data burst when the determined generation period arrives or when an amount of received packets is equal to the determined size.

10. The data burst processing method of claim 8, wherein the data burst is generated by adjusting at least one of a size and a generation period of a subsequent data burst when the generated data burst collides with an external data burst.

11. The data burst processing method of claim 8, further comprising:

classifying a plurality of packets on a certain basis when the plurality of packets is received;

wherein the data burst is generated using the classified packets.

12. The data burst processing method of claim 8, further comprising:

outputting the generated data burst to an external node.

13. The data burst processing method of claim 8, wherein the data traffic condition is monitored by checking status of nodes belonging to the network, and the network adopts a General Multi Protocol Label Switching (GMPLS) protocol.

14. The data burst processing method of claim 8, wherein the generation parameter is a parameter relating to at least one of an assembly period for generating the data burst and a size of the data burst.

15. A non-transitory computer readable medium comprising instructions that, when executed by a data burst generation apparatus, cause the apparatus to perform the method of claim 8.

16. A data burst processing method to process and generate a data burst to be transmitted through a network, the method comprising:

receiving a packet from at least one source;

monitoring a data traffic condition of the network;

dynamically determining an optimal value of a generation parameter to generate the data burst with respect to the received packet according to the data traffic condition of the network; and generating the data burst using the optimal generation parameter value, wherein the determining of the optimal value of the generation parameter comprises:

measuring Hurst parameter changes according to data traffic conditions by adjusting setting values of the generation parameter;

classifying the setting values of the generation parameter based on sensitivity to the Hurst parameter based on the measured Hurst parameter changes; and determining the optimal generation parameter value by applying a weight to a parameter corresponding to the monitoring result among the classified setting values of the generation parameter.

* * * * *